US011325087B2

(12) United States Patent
Baxter (10) Patent No.: US 11,325,087 B2
(45) Date of Patent: May 10, 2022

(54) DEVICES AND METHODS FOR SEPARATING COMPONENTS

(71) Applicant: Sustainable Energy Solutions, Inc., Provo, UT (US)

(72) Inventor: Larry Baxter, Orem, UT (US)

(73) Assignee: Sustainable Energy Solutions, Inc., Ball Ground, GA (US)

(*) Notice: Subject to any disclaimer, the term of this patent is extended or adjusted under 35 U.S.C. 154(b) by 315 days.

(21) Appl. No.: 16/372,408

(22) Filed: Apr. 2, 2019

(65) Prior Publication Data

US 2020/0316547 A1    Oct. 8, 2020

(51) Int. Cl.
*B01J 8/00* (2006.01)
*B01D 3/06* (2006.01)
*B01J 8/02* (2006.01)
*B01J 4/00* (2006.01)

(52) U.S. Cl.
CPC .............. *B01J 8/002* (2013.01); *B01D 3/06* (2013.01); *B01J 4/007* (2013.01); *B01J 4/008* (2013.01); *B01J 8/0278* (2013.01)

(58) Field of Classification Search
USPC ....... 95/266, 39, 247; 422/527, 547; 96/181, 96/193, 201, 202, 218, 219, 243, 373
See application file for complete search history.

(56) References Cited

U.S. PATENT DOCUMENTS

| | | | | |
|---|---|---|---|---|
| 4,354,859 | A * | 10/1982 | Keller, II | B01D 53/047 95/96 |
| 10,807,924 | B1 * | 10/2020 | Baxter | B01D 3/141 |
| 2008/0135239 | A1 * | 6/2008 | Edwards | E21B 49/084 166/264 |
| 2011/0272166 | A1 * | 11/2011 | Hunt | E21B 43/40 166/402 |
| 2018/0200666 | A1 * | 7/2018 | Baxter | F25J 3/067 |
| 2018/0290094 | A1 * | 10/2018 | Chandran | C10G 2/34 |
| 2018/0306501 | A1 * | 10/2018 | Baxter | B01D 17/045 |
| 2019/0168175 | A1 * | 6/2019 | Baxter | B01F 5/043 |
| 2019/0192998 | A1 * | 6/2019 | Baxter | B01D 21/10 |
| 2020/0306768 | A1 * | 10/2020 | Baxter | F25J 3/067 |

FOREIGN PATENT DOCUMENTS

DE    102013114210 B3 *   2/2015   ............. F04B 9/133

* cited by examiner

*Primary Examiner* — Nina Bhat
(74) *Attorney, Agent, or Firm* — Cook Alex Ltd.

(57) ABSTRACT

A method, system, and device for separating components is described. A vessel is provided. A first volume of a process liquid, containing a first component and a second component, is passed into an inner chamber. The piston retracts to a first position. The fluid inlet is closed. The piston is retracted to a second position, causing the first component and a first portion of the second component to flash to form a vapor stream while a second portion of the second component freezes to form a solid product stream. The fluid outlet is then opened. The piston is advanced to a third position that results in a third volume, smaller than the first volume, such that the vapor stream is expelled. The fluid outlet is closed. The piston is fully closed such that the solid product stream is pressed into and extruded through the solids outlet.

19 Claims, 8 Drawing Sheets

401
Provide a vessel consisting of an inner chamber, a piston, a solids outlet, a fluid inlet, and a fluid outlet.

402
Open the fluid inlet.

403
Pass a first volume of a process liquid, containing first and second components, through the fluid inlet into the inner chamber, the piston retracting to a first position, the first position resulting in the volume of the inner chamber being the first volume.

404
Close the fluid inlet.

405
Pull the piston to a second position such that the volume of the inner chamber increases to a second volume.

406
Pull the piston to a second position such that the volume of the inner chamber increases to a second volume.

407
Flash the first component and a first portion of the second component to form a vapor stream.

408
Freeze the second portion of the second component to form a solid product stream.

409
Open the fluid outlet.

410
Advance the piston to a third position resulting in a third volume smaller than the first volume such that the vapor stream is expelled.

411
Close the fluid outlet.

412
Fully close the piston such that the solid product stream is pressed into and extruded through the solids outlet.

FIG. 4B

DEVICES AND METHODS FOR SEPARATING COMPONENTS

GOVERNMENT INTEREST STATEMENT

This invention was made with government support under DE-FE0028697 awarded by the Department of Energy. The government has certain rights in the invention.

TECHNICAL FIELD

The methods and devices described herein relate generally to separation of components.

BACKGROUND

Distillation, absorption, membranes, and most other traditional separation processes increase fluid purity using differences in fluid-phase properties. However, all species generally remain at some concentration in all phases or streams. In some cases, one or more chemical species exhibits phase behavior to the exclusion of all other species. The most common example of this is solids formation. It is common that solids contain a single species that is thermodynamically pure, to the exclusion of all other species. In practice, other species generally remain as contaminants, but this is because of an inability to completely separate the solid from the other phases, not because more than one species is in the solid.

SUMMARY

In a first aspect, the disclosure provides a method for separating components. A vessel is provided consisting of an inner chamber, a piston, a solids outlet, a fluid inlet, and a fluid outlet. The fluid inlet is opened. A first volume of a process liquid, containing a first component and a second component, is passed through the fluid inlet into the inner chamber. The piston retracts to a first position. The first position results in the inner chamber having the first volume. The fluid inlet is closed. The piston is retracted to a second position such that a volume of the inner chamber increases to a second volume, causing the first component and a first portion of the second component to flash to form a vapor stream while a second portion of the second component freezes to form a solid product stream. The fluid outlet is then opened. The piston is advanced to a third position that results in a third volume, smaller than the first volume, such that the vapor stream is expelled. The fluid outlet is closed. The piston is fully closed such that the solid product stream is pressed into and extruded through the solids outlet.

In a second aspect, the disclosure provides a vessel for separating components. The vessel consists of a fluid inlet, an inner chamber, a piston whose position defines a volume of the inner chamber, a fluid outlet, and a solids outlet. The fluid inlet is opened. A first volume of a process liquid, containing a first component and a second component, is passed through the fluid inlet into the inner chamber. The piston retracts to a first position. The first position resulting in the inner chamber having the first volume. The fluid inlet is closed. The piston is pulled to a second position such that the volume of the inner chamber increases to a second volume. This causes the first component and a first portion of the second component to flash to form a vapor stream while a second portion of the second component freezes to form a solid product stream. The fluid outlet is opened. The piston is advanced to a third position resulting in the volume decreasing to a third volume that is smaller than the first volume, such that the vapor stream is expelled. The fluid outlet is closed. The piston is fully closed such that the solid product stream is pressed into and extruded through the solids outlet.

In a third aspect, the disclosure provides a system for separating components. The system consists of a vessel with a fluid inlet, an inner chamber, a piston, and a fluid outlet. The fluid inlet is configured to receive a first volume of a process liquid, containing a first component and a second component, and to pass the first volume of the process liquid into the inner chamber. The piston is configured to retract to a first position, with the first position resulting in the inner chamber having the first volume. The fluid inlet is configured to then close. The piston is configured to retract to a second position such that the volume of the inner chamber increases to a second volume. This causes the first component and a first portion of the second component to flash to form a vapor stream while a second portion of the second component freezes to form a solid product stream. The fluid outlet is configured to then open. The piston is configured to advance to a third position, resulting in the volume decreasing to a third volume that is smaller than the first volume, such that the vapor stream is expelled. The fluid outlet is configured to then close. The piston is configured to fully close such that the solid product stream is pressed into and extruded through the solids outlet.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "positions" of the piston are not limited to exact physical locations in which the piston stops, slows, or pauses. Rather, the "positions" are largely defined by valve open/close timing and the geometry of the piston and cylinder.

Separations of liquid components is a challenge faced by most industries. Distillation, crystallization, and other techniques are often expensive, energy intensive, and complex. The present invention is able to separate liquid components in a simple, thermodynamically efficient manner. The methods, devices, and systems described will work for any combination of components where the first component is a compound or combination of compounds that vaporizes while the second component freezes during expansion of the liquid mixture. A vessel with a piston is provided. The vessel is partially filled with a process liquid consisting of first and second components. The piston is then retracted so that the volume of the vessel increases. The volume increase results in the first component and some of the second component flashing to the vapor phase. The heat of vaporization is supplied by the balance of the second component. The second component freezes to form a solid product. The vapor phase is expelled by returning the piston partway to closed. The solid product is then pressed into and extruded out an outlet by closing the piston the rest of the way. In this manner, what would be a liquid-liquid separation is turned into a gas-solid separation.

Figure 1A:
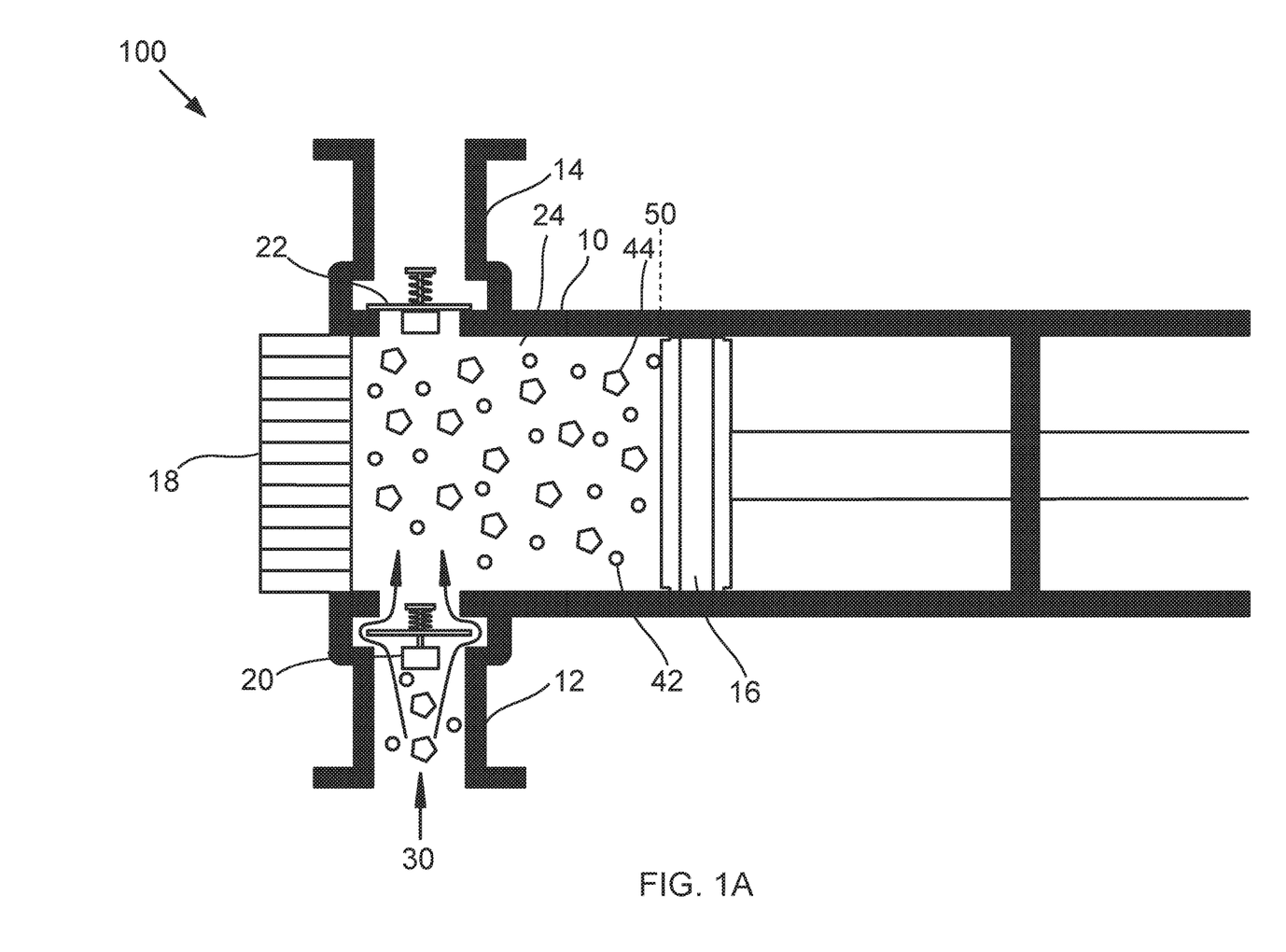
FIGS. 1A-D are cross-sectional views of a piston at various stages of an open/close cycle that may be used for separating components in one embodiment of the present invention.
Figure 1B:
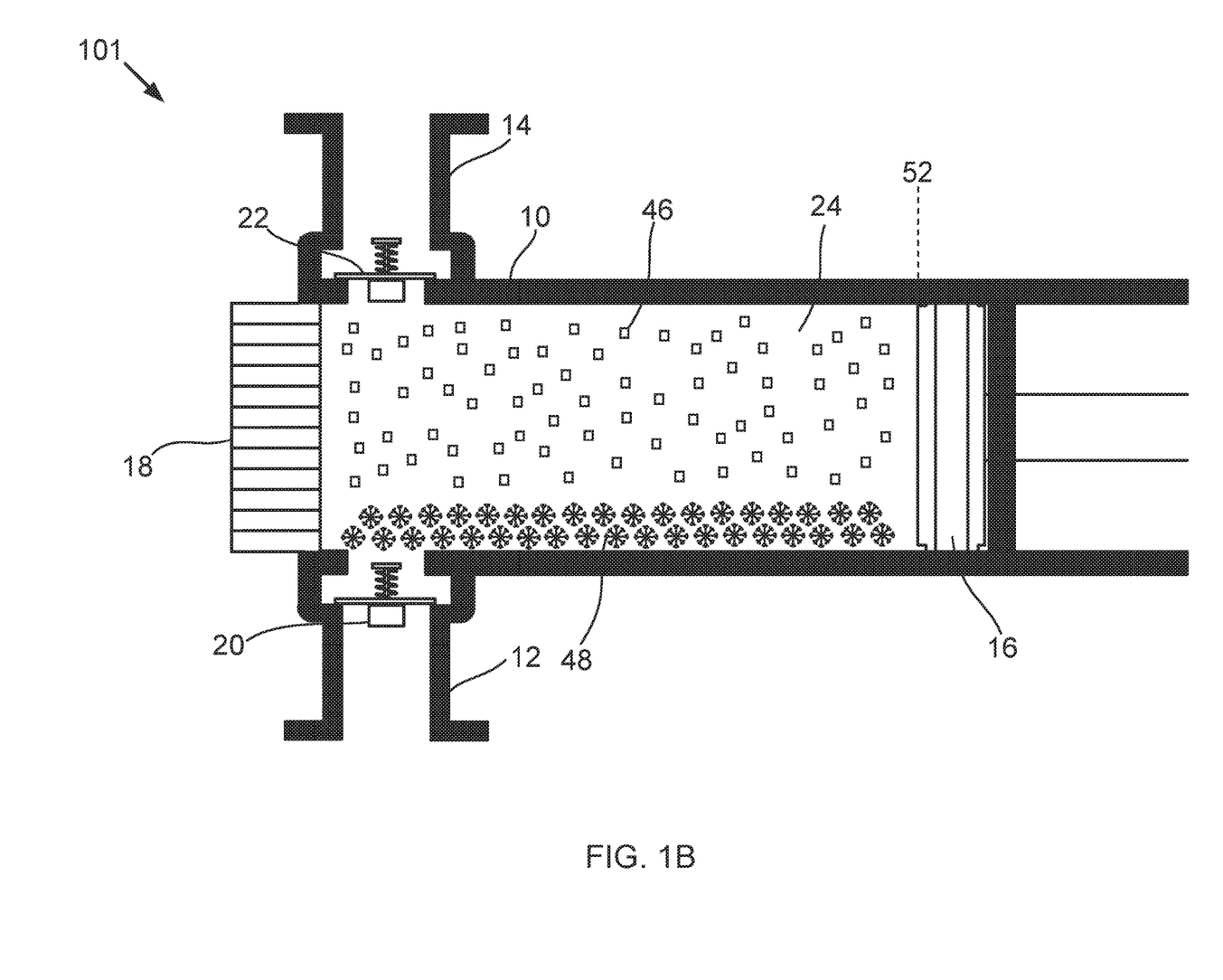
Figure 1C:
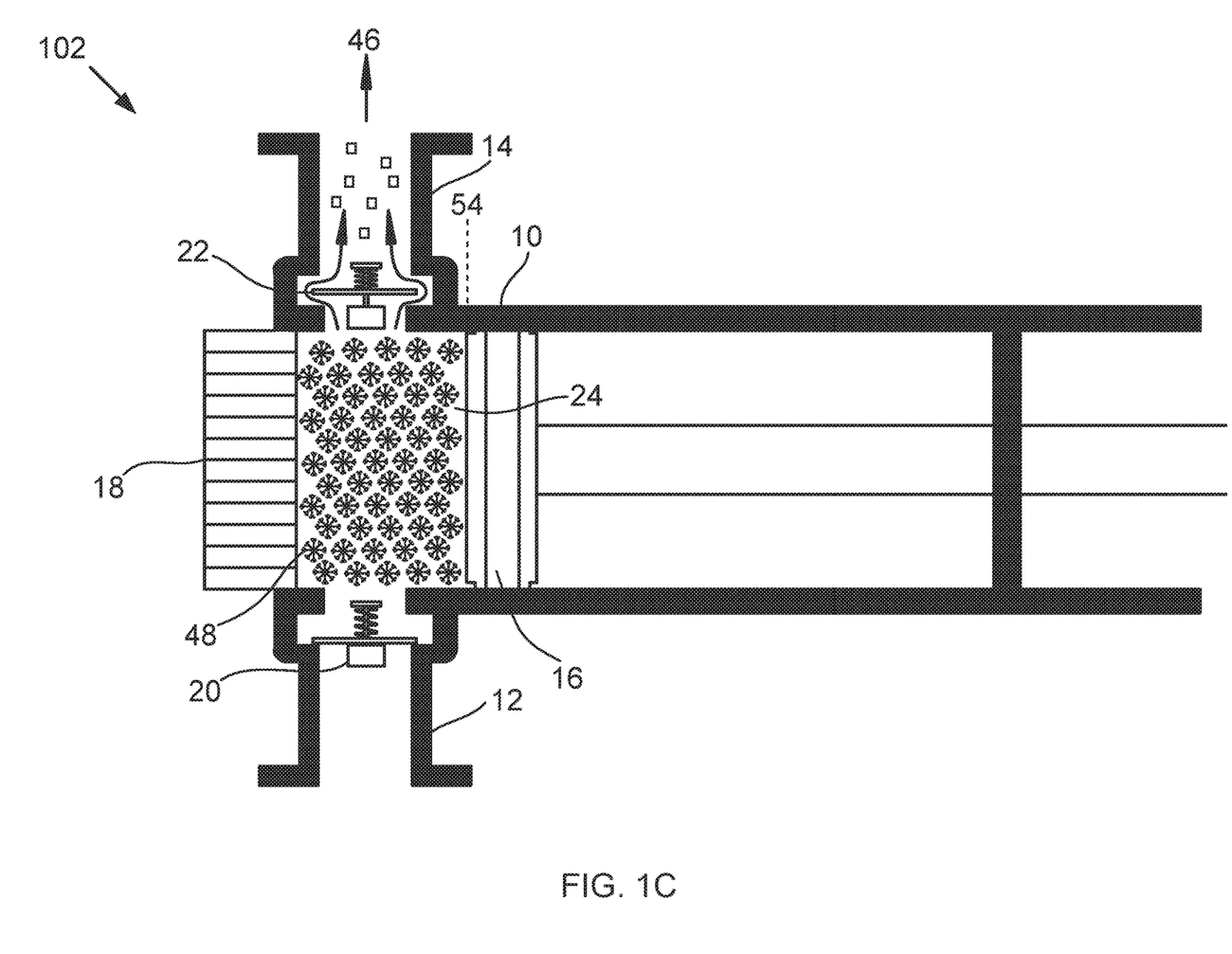
Figure 1D:
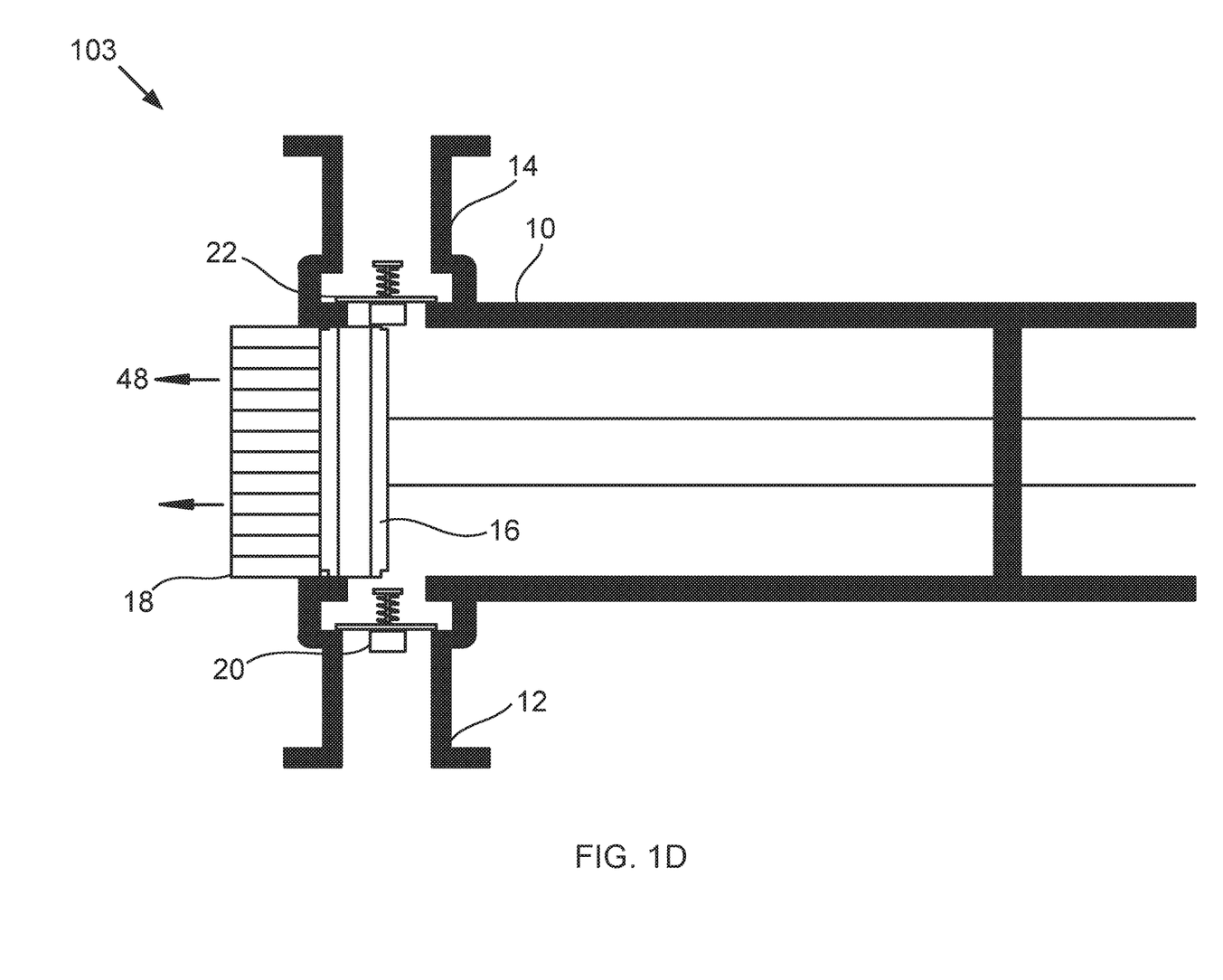

Now referring to FIG. 1, FIG. 1A is a cross-sectional view 100 of a piston for separating components, the piston being filled, that may be used in one embodiment of the present invention. FIG. 1B is a cross-sectional view 101 of the piston of FIG. 1A in a fully-open position. FIG. 1C is a cross-sectional view 102 of the piston of FIG. 1A in a nearly-closed position. FIG. 1D is a cross-sectional view 103 of the piston of FIG. 1D in a fully-closed position. The piston 10 consists of an inner chamber 24, an inlet 12 with inlet valve 20, an outlet 14 with an outlet valve 22, solids outlets 18, and a piston 16. The solids outlets 18 act as extruders in some embodiments. The inner chamber 24 varies in volume depending on the position of the piston. Inlet valve 20 is opened and a first volume of a process liquid 30 is passed into the inner chamber 24, the piston 16 being pushed by the force of the process liquid 30 from fully closed to a first position 50 such that the volume of the inner chamber 24 is the first volume. The process liquid 30 consists of a first component 42 and a second component 44. The inlet valve 20 is then closed.

The piston 16 then expands to a second position 52, causing the volume of the inner chamber 24 to increase to a second volume. Increase of volume lowers the pressure in the inner chamber 24 causing the first component 42 and a first portion of the second component 44 to vaporize to form a vapor stream 46. The heat of vaporization cools the stream, including the remainder of the second component 44, causing the second component to freeze to form a solid product stream 48. The outlet valve 22 is then opened.

The piston 16 moves to a third position 54, resulting in the inner chamber 24 having a third volume that is smaller than the first volume. The third volume is small enough that the vapor stream 46 is expelled while the solid product stream 48 is not pushed out the outlet 14. The outlet valve 22 is then closed.

The piston 16 then moves to a position in which vessel 24 has the least volume. In a preferred embodiment, this is fully closed. In alternative embodiments, this is closed leaving a small amount of the solid product stream 48 between the piston 16 and the solids outlets 18. In either embodiment, the closing causes the solid product stream 48 to be pressed into the solids outlets 18. Each cycle of the piston 16 presses more of the solid product stream 48 to be pressed into the solids outlets 18, with the solids product stream 48 thereby extruding through the solids outlets 18 and forming a pressure seal. In this manner, the solids outlets 18 do not need a valve or other closing device to prevent the process liquid 30 from passing through the solids outlets 18. Rather, each cycle presses more solids further through the solids outlets 18 into a chamber, pipe, or other receiving equipment.

In a preferred embodiment, the first component 42 is natural gas and the second component 44 is carbon dioxide. In an alternate embodiment, the first component 42 is methane and the second component 44 is carbon dioxide.

In some embodiments, retraction of the piston 16 during initial filling by the process liquid 30 requires the process liquid 30 is pumped or otherwise forced into the piston, the force of filling causing the retraction of the piston 16. In other embodiments, the process liquid 30 is pulled into the inner chamber 24 by the piston being retracted.

In some embodiments, pulling the piston 16 to the second position 52 requires the piston be pulled by a motor or other force-inducing device. In other embodiments, the first component 42 is sufficiently volatile that the piston 16 is pushed to the second position 52 by the vapor stream 46 being formed.

In a preferred embodiment, none of the first or second components remain as liquids after decompression. In an alternate embodiment, a portion of the first component, the second component, or both may remain as a liquid.

Figure 2:
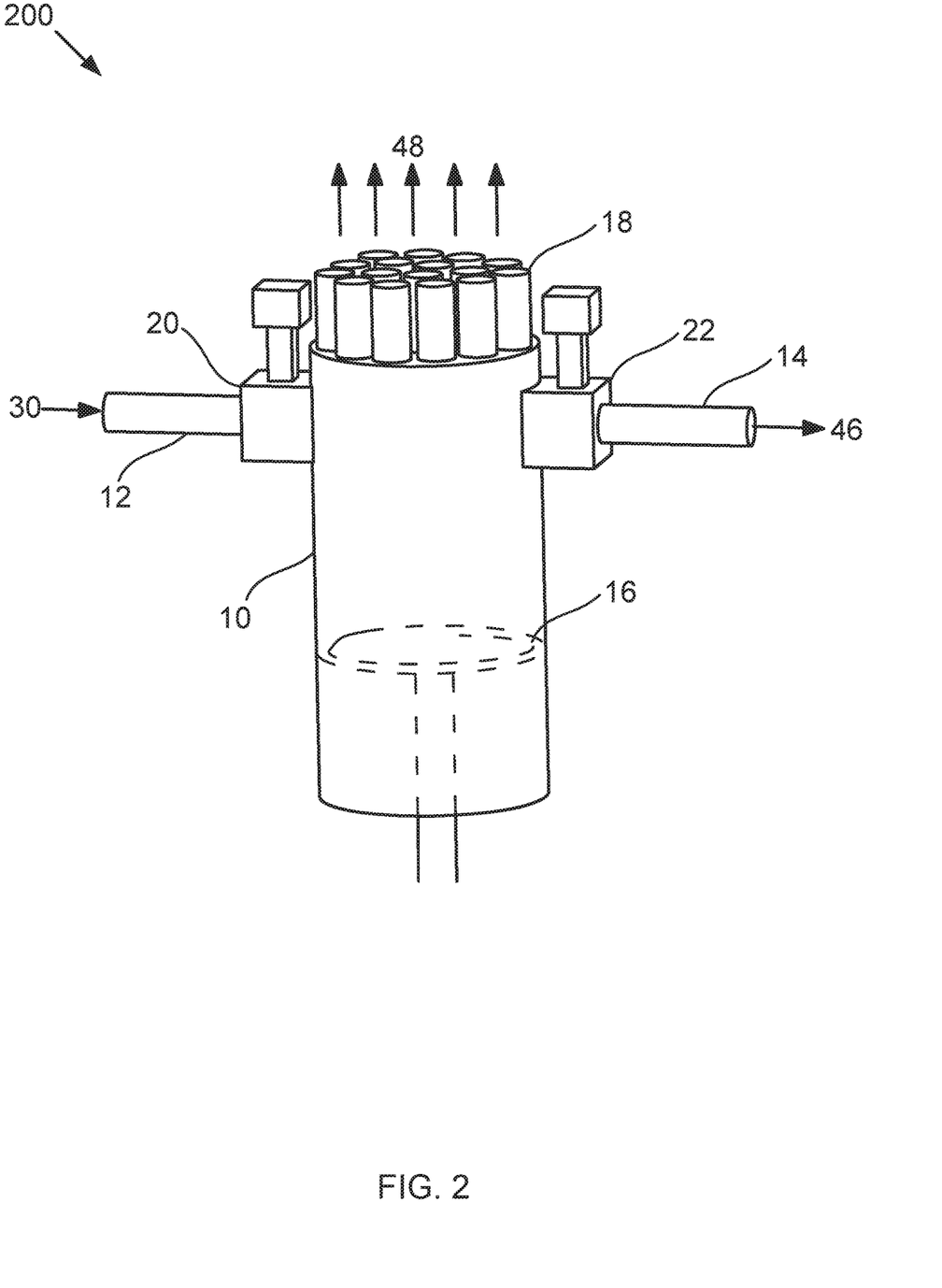
FIG. 2 is an isometric elevation view of a piston that may be used for separating components in one embodiment of the present invention.

Now referring to FIG. 2, FIG. 2 is an isometric elevation view of a piston that may be used as the piston of FIGS. 1A-D. The valves 20 and 22 are as close to flush against the piston 10 as practical to minimize any buildup locations that the solids product stream 48 could collect in.

Figure 3:
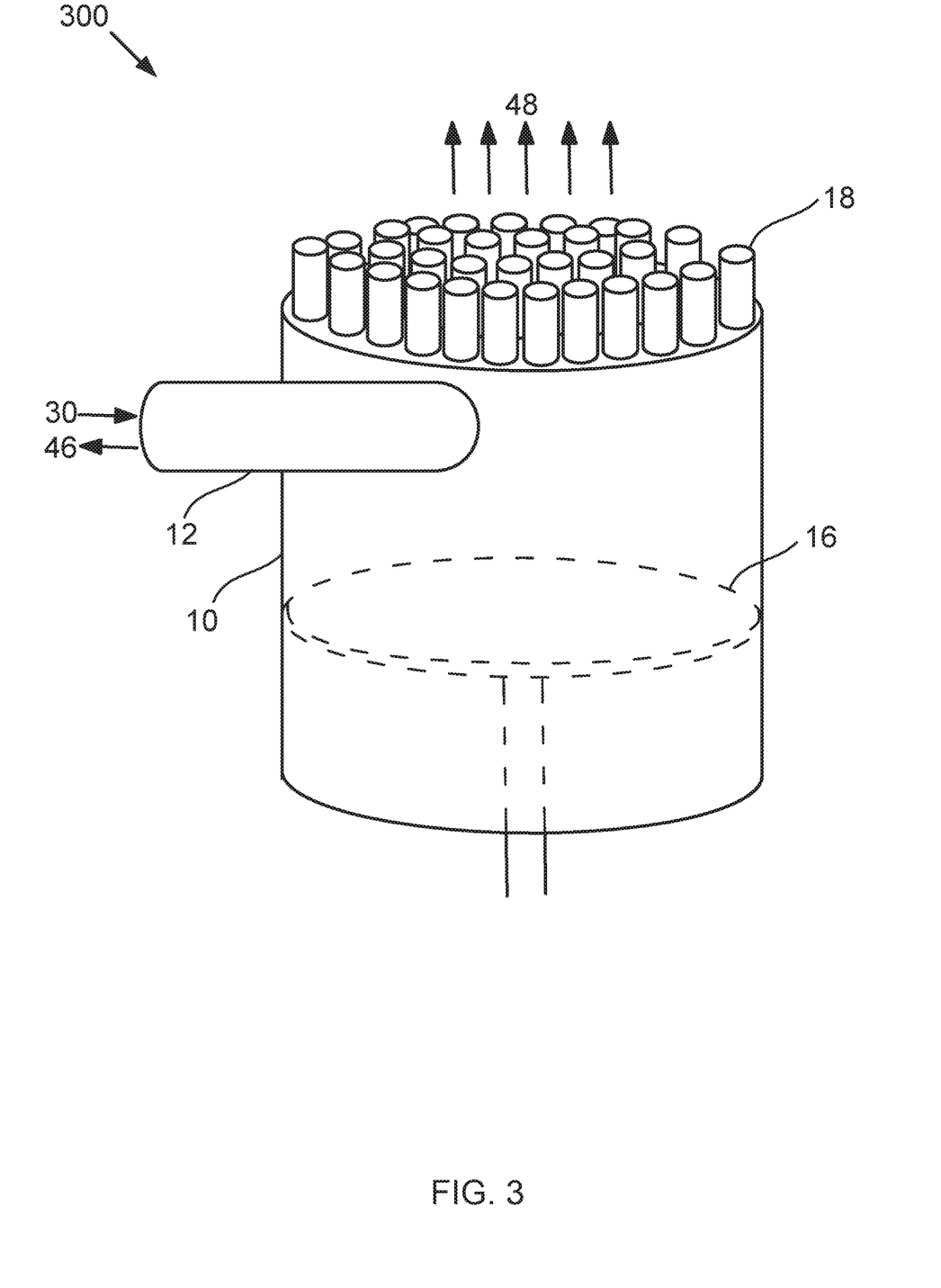
FIG. 3 is an isometric elevation view of a piston that may be used for separating components in one embodiment of the present invention.

Now referring to FIG. 3, FIG. 3 is an isometric elevation view 300 of a piston that may be used as the piston of FIGS. 1A-D, with modifications. The most significant change between this piston and the piston of FIG. 2 is that the inlet and the outlet are the same. In some embodiments, a three-way valve (not shown) on inlet/outlet 12 determines whether the inlet/outlet 12 is acting as an inlet or as an outlet.

The solids outlets 18 are shown in FIGS. 1, 2, and 3 as a bundle of tubes. In another embodiment, a single outlet tube is used.

Figure 4A:
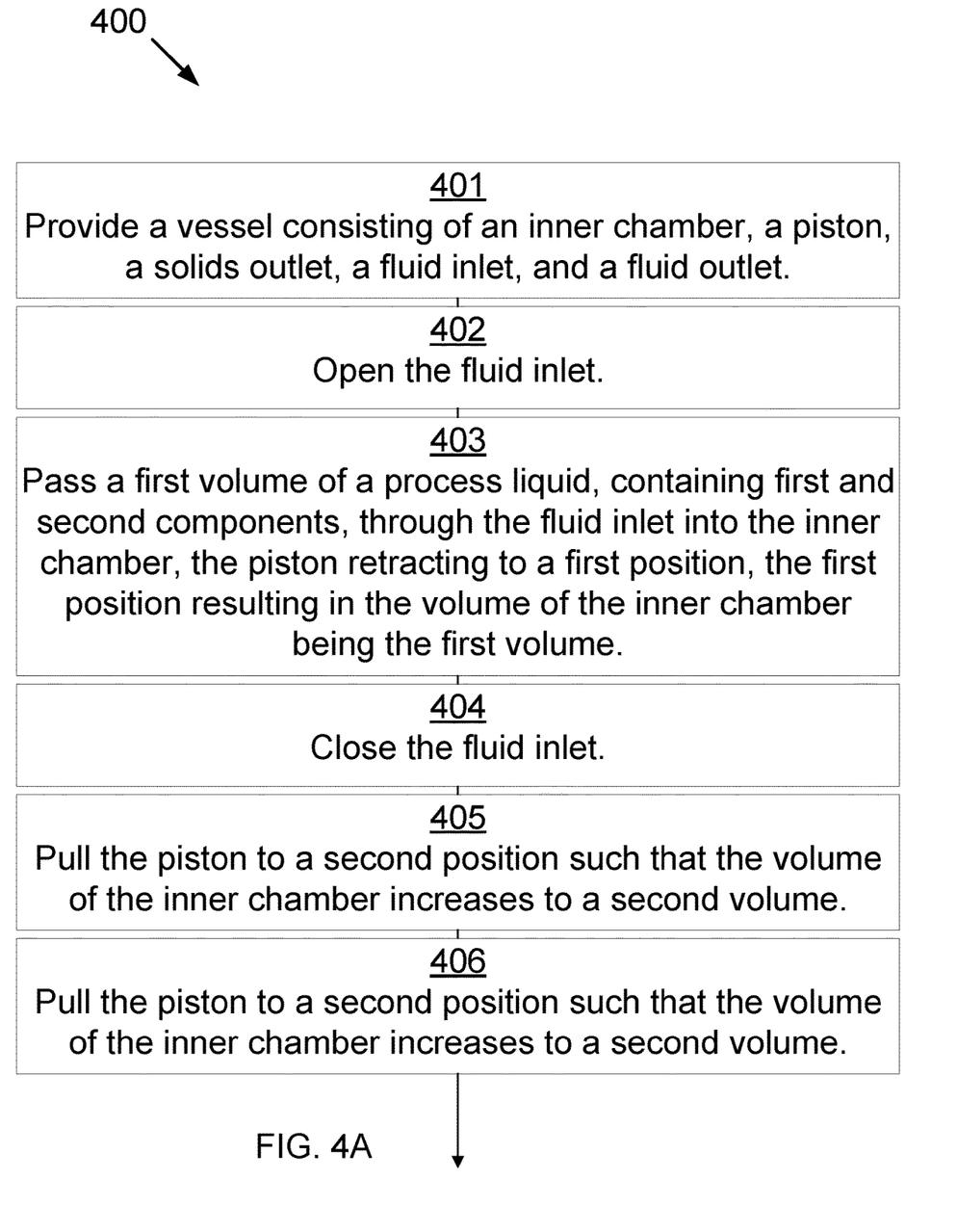
FIGS. 4A and 4B illustrate a block diagram of a method for separating components that may be used in one embodiment of the present invention
Figure 4B:
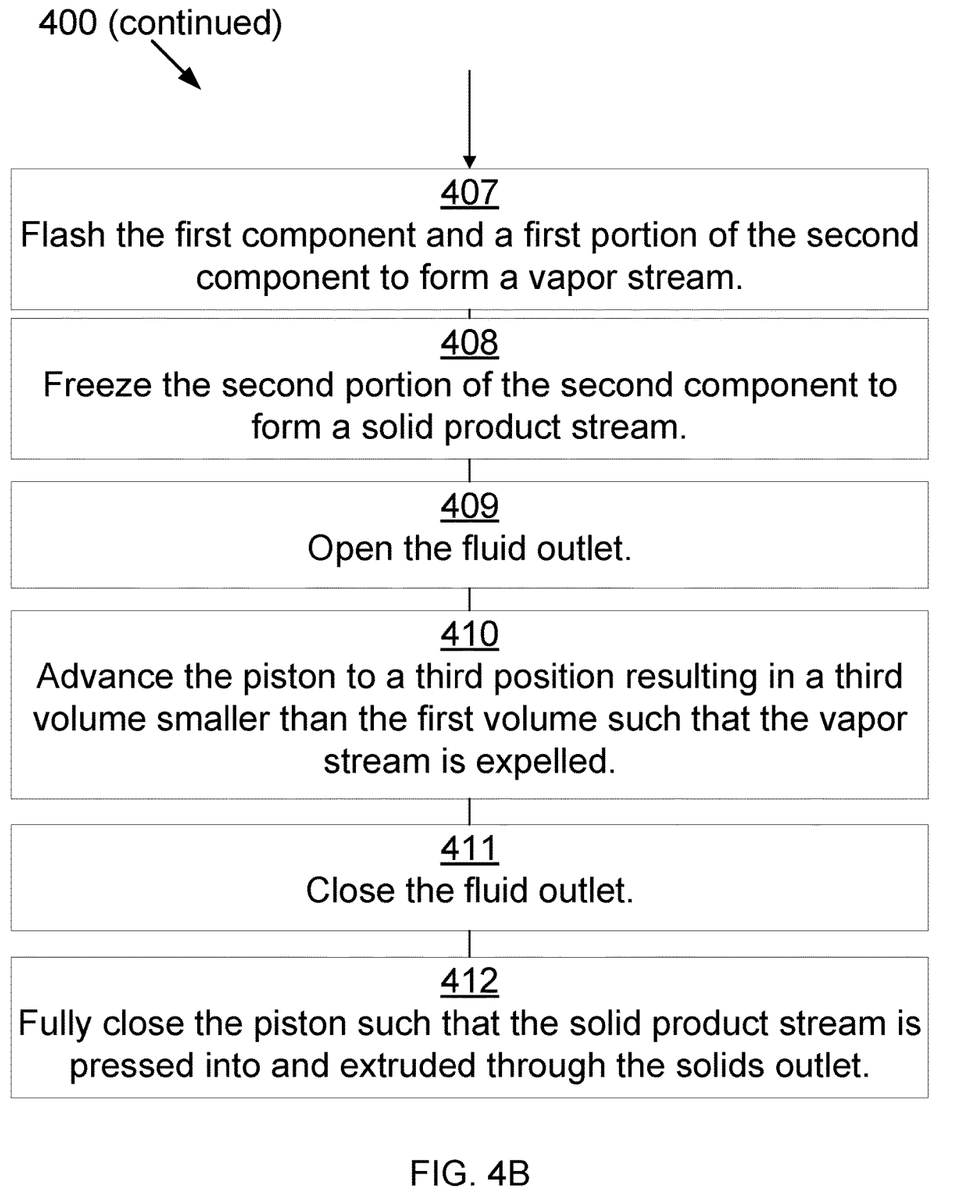

Now referring to FIGS. 4A and 4B, FIGS. 4A and 4B illustrate a block diagram 400 of a method for separating components that may be used in one embodiment of the present invention. At 401, a vessel is provided consisting of an inner chamber, a piston, a solids outlet, a fluid inlet, and a fluid outlet. At 402, the fluid inlet is opened. At 403, a first volume of a process liquid, containing first and second components, is passed through the fluid inlet into the inner chamber, the piston retracting to a first position, the first position resulting in the volume of the inner chamber being the first volume. At 404, the fluid inlet is closed. At 405, the piston is pulled to a second position such that the volume of the inner chamber increases to a second volume. At 406, the first component and a first portion of the second component flash to form a vapor stream. At 407, the second portion of the second component freezes to form a solid product stream. At 408, the fluid outlet is opened. At 409, the piston is advanced to a third position resulting in a third volume smaller than the first volume, such that the vapor stream is expelled. At 410, the fluid outlet is closed. At 411, the piston is fully closed such that the solid product stream is pressed into and extruded through the solids outlet.

In some embodiments, the first component is a hydrocarbon selected from the group consisting of methane, ethane, propane, isobutane, n-butane, and combinations thereof. In some embodiments, the second component is an acid gas selected from the group consisting of carbon dioxide, sulfur oxides, nitrogen oxides, carbon monoxide, and combinations thereof.

In some embodiments, interior surfaces of the vessel are constructed of materials selected from the group consisting of polytetrafluoroethylene, polychlorotrifluoroethylene, smooth ceramics, natural diamond, man-made diamond, chemical-vapor deposition diamond, polycrystalline diamond, and combinations thereof.

In some embodiments, the vapor stream and the solid product stream are passed against the process liquid in an indirect-contact heat exchanger.

In some embodiments, the piston being forced open by the process liquid is coupled with other equipment, supplying a portion of the work needed to run the other equipment.

In some embodiments, the work produced by decompression in the expander can be used to run the compressor.

The invention has been described with reference to various specific and preferred embodiments and techniques. Nevertheless, it is understood that many variations and modifications may be made while remaining within the spirit and scope of the invention.

What is claimed is:

1. A method for separating components comprising:
   providing a vessel comprising an inner chamber, a piston, a solids outlet, a fluid inlet, and a fluid outlet;
   opening the fluid inlet;
   passing a first volume of a process liquid, comprising a first component and a second component, through the fluid inlet into the inner chamber, the piston retracting to a first position, the first position resulting in the inner chamber comprising the first volume;
   closing the fluid inlet;
   retracting the piston to a second position such that a volume of the inner chamber increases to a second volume which lowers a pressure in the inner chamber causing the first component and a first portion of the second component to flash to form a vapor stream while a second portion of the second component freezes to form a solid product stream due to cooling by heat of vaporization consumed in forming the vapor stream;
   opening the fluid outlet;
   advancing the piston to a third position resulting in a third volume, smaller than the first volume, such that the vapor stream is expelled;
   closing the fluid outlet; and
   fully closing the piston such that the solid product stream is pressed into and extruded through the solids outlet.

2. The method of claim 1, wherein the first component comprises a hydrocarbon selected from the group consisting of methane, ethane, propane, isobutane, n-butane, and combinations thereof.

3. The method of claim 2, wherein the second component comprises an acid gas selected from the group consisting of carbon dioxide, sulfur oxides, nitrogen oxides, carbon monoxide, and combinations thereof.

4. The method of claim 1, wherein the solids outlet is packed with the solid product stream such that the process liquid stream and the vapor stream are prevented from passing through the solids outlet.

5. The method of claim 1, wherein interior surfaces of the vessel are constructed of materials selected from the group consisting of polytetrafluoroethylene, polychlorotrifluoroethylene, smooth ceramics, natural diamond, man-made diamond, chemical-vapor deposition diamond, polycrystalline diamond, and combinations thereof.

6. The method of claim 1, further comprising passing the vapor stream and the solid product stream against the process liquid in an indirect-contact heat exchanger.

7. A vessel for separating components comprising:
   a fluid inlet;
   an inner chamber;
   a piston whose position defines a volume of the inner chamber;
   a fluid outlet; and
   a solids outlet;
   wherein:
      the fluid inlet is opened;
      a first volume of a process liquid, comprising a first component and a second component, is passed through the fluid inlet into the inner chamber, the piston retracting to a first position, the first position resulting in the inner chamber comprising the first volume;
      the fluid inlet is closed;
      the piston is pulled to a second position such that the volume of the inner chamber increases to a second volume which lowers a pressure in the inner chamber causing the first component and a first portion of the second component to flash to form a vapor stream while a second portion of the second component freezes to form a solid product stream due to cooling by heat of vaporization consumed in forming the vapor stream;
      the fluid outlet is opened;
      the piston is advanced to a third position resulting in the volume decreasing to a third volume that is smaller than the first volume, such that the vapor stream is expelled;
      the fluid outlet is closed; and
      the piston is fully closed such that the solid product stream is pressed into and extruded through the solids outlet.

8. The vessel of claim 7, wherein the first component comprises a hydrocarbon selected from the group consisting of methane, ethane, propane, isobutane, n-butane, and combinations thereof.

9. The vessel of claim 8, wherein the second component comprises an acid gas selected from the group consisting of carbon dioxide, sulfur oxides, nitrogen oxides, carbon monoxide, and combinations thereof.

10. The vessel of claim 7, wherein the solids outlet comprises a bundle of tubes.

11. The vessel of claim 7, wherein the solids outlet is packed with the solid product stream such that the process liquid stream and the vapor stream are prevented from passing through the solids outlet.

12. The vessel of claim 7, wherein interior surfaces of the vessel are constructed of materials selected from the group consisting of polytetrafluoroethylene, polychlorotrifluoroethylene, smooth ceramics, natural diamond, man-made diamond, chemical-vapor deposition diamond, polycrystalline diamond, and combinations thereof.

13. A system for separating components comprising:
a vessel comprising a fluid inlet, an inner chamber, a piston, and a fluid outlet;
the fluid inlet configured to receive a first volume of a process liquid, comprising a first component and a second component, and to pass the first volume of the process liquid into the inner chamber;
the piston configured to retract to a first position, the first position resulting in the inner chamber comprising the first volume;
the fluid inlet configured to then close;
the piston being configured to retract to a second position such that the volume of the inner chamber increases to a second volume which lowers a pressure in the inner chamber causing the first component and a first portion of the second component to flash to form a vapor stream while a second portion of the second component freezes to form a solid product stream due to cooling by heat of vaporization consumed in forming the vapor stream;
the fluid outlet configured to then open;
the piston being configured to advance to a third position resulting in the volume decreasing to a third volume that is smaller than the first volume, such that the vapor stream is expelled;
the fluid outlet configured to then close; and
the piston configured to fully close such that the solid product stream is pressed into and extruded through the solids outlet.

14. The system of claim 13, wherein the first component comprises a hydrocarbon selected from the group consisting of methane, ethane, propane, isobutane, n-butane, and combinations thereof.

15. The system of claim 14, wherein the second component comprises an acid gas selected from the group consisting of carbon dioxide, sulfur oxides, nitrogen oxides, carbon monoxide, and combinations thereof.

16. The system of claim 13, wherein the solids outlet comprises a bundle of tubes.

17. The system of claim 13, wherein the solids outlet is packed with the solid product stream such that the process liquid stream and the vapor stream are prevented from passing through the solids outlet.

18. The system of claim 13, further comprising an indirect-contact heat exchanger configured to warm the vapor stream and the solid product stream against the process liquid.

19. The system of 13, wherein interior surfaces of the vessel are constructed of materials selected from the group consisting of polytetrafluoroethylene, polychlorotrifluoroethylene, smooth ceramics, natural diamond, man-made diamond, chemical-vapor deposition diamond, polycrystalline diamond, and combinations thereof.

* * * * *